(12) United States Patent
Chew et al.

(10) Patent No.: US 11,873,084 B2
(45) Date of Patent: Jan. 16, 2024

(54) AIRCRAFT WITH DUCTED FAN AND MOVABLE LOUVERS OVER THE DUCTED FAN

(71) Applicant: Dr. Ing. h.c. F. Porsche Aktiengesellschaft, Stuttgart (DE)

(72) Inventors: Guan Chew, Bietigheim-Bissingen (DE); Stefan Bender, Löchgau (DE); Michael Fuerstner, Gerlingen (DE); Mikel Fauri, Ludwigsburg (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 226 days.

(21) Appl. No.: 16/869,765

(22) Filed: May 8, 2020

(65) Prior Publication Data

US 2020/0354052 A1    Nov. 12, 2020

(30) Foreign Application Priority Data

May 9, 2019   (DE) .................... 10 2019 112 132.9

(51) Int. Cl.
| | |
|---|---|
| *B64C 29/00* | (2006.01) |
| *B64D 27/24* | (2006.01) |
| *B64C 39/00* | (2023.01) |
| *B64C 9/00* | (2006.01) |
| *B60L 53/10* | (2019.01) |
| *B60L 50/60* | (2019.01) |
| *B64C 13/16* | (2006.01) |

(52) U.S. Cl.
CPC .......... *B64C 29/0033* (2013.01); *B60L 50/60* (2019.02); *B60L 53/11* (2019.02); *B64C 9/00* (2013.01); *B64C 13/16* (2013.01); *B64C 39/008* (2013.01); *B64D 27/24* (2013.01); *B60L 2200/10* (2013.01)

(58) Field of Classification Search
CPC ............ B64C 29/0016; B64C 29/0025; B64C 29/0033; B60L 50/60; B60L 53/11
See application file for complete search history.

(56) References Cited

U.S. PATENT DOCUMENTS

| | | | |
|---|---|---|---|
| 2,988,301 A | 6/1961 | Fletcher | |
| 3,088,694 A | 5/1963 | Stirgwolt et al. | |
| 3,110,456 A | 11/1963 | Creasey et al. | |
| 3,116,898 A * | 1/1964 | Clark | .................. B64C 29/0016 244/23 B |
| 4,469,294 A * | 9/1984 | Clifton | .................... B64C 39/12 244/12.3 |
| 4,828,203 A * | 5/1989 | Clifton | ................ B64C 29/0033 244/12.3 |
| 5,407,150 A * | 4/1995 | Sadleir | ................ B64C 29/0025 244/23 B |
| 5,454,531 A | 10/1995 | Melkuti | |
| 5,507,453 A * | 4/1996 | Shapery | ............. B64C 29/0025 244/73 C |

(Continued)

FOREIGN PATENT DOCUMENTS

| | | |
|---|---|---|
| GB | 2555440 A | 5/2018 |
| WO | 2006113877 A2 | 10/2006 |
| WO | 2016066848 A1 | 5/2016 |

*Primary Examiner* — Michael H Wang
(74) *Attorney, Agent, or Firm* — RatnerPrestia

(57) ABSTRACT

An aircraft includes a wing that is extended through by a ducted fan having movable louvers.

20 Claims, 3 Drawing Sheets

(56) References Cited

U.S. PATENT DOCUMENTS

| | | | | |
|---|---|---|---|---|
| 6,105,901 | A * | 8/2000 | Ulanoski | F01D 17/162 |
| | | | | 60/228 |
| 6,561,456 | B1 * | 5/2003 | Devine | B64C 29/0025 |
| | | | | 244/12.3 |
| 8,181,903 | B2 * | 5/2012 | Posva | B64C 15/14 |
| | | | | 244/12.3 |
| 8,342,441 | B2 * | 1/2013 | Yoeli | B64C 27/20 |
| | | | | 244/17.11 |
| 8,496,200 | B2 * | 7/2013 | Yoeli | B64C 29/0025 |
| | | | | 244/23 B |
| 9,856,018 | B2 * | 1/2018 | King | B64C 29/0025 |
| 11,203,412 | B2 * | 12/2021 | Lee | B64C 11/001 |
| 11,358,714 | B2 * | 6/2022 | Bender | B64C 3/56 |
| 11,370,323 | B2 * | 6/2022 | Fauri | B64D 41/00 |
| 2004/0094662 | A1 | 5/2004 | Sanders, Jr. et al. | |
| 2004/0232279 | A1 | 11/2004 | Melkuti | |
| 2008/0054121 | A1 * | 3/2008 | Yoeli | B64C 1/1415 |
| | | | | 244/12.1 |
| 2009/0084907 | A1 * | 4/2009 | Yoeli | B64C 27/20 |
| | | | | 415/149.1 |
| 2016/0214710 | A1 * | 7/2016 | Brody | B64C 27/26 |
| 2016/0368600 | A1 * | 12/2016 | Frolov | B64C 37/02 |
| 2017/0158321 | A1 * | 6/2017 | Mia | B64C 29/005 |
| 2017/0197711 | A1 | 7/2017 | King et al. | |

* cited by examiner

AIRCRAFT WITH DUCTED FAN AND MOVABLE LOUVERS OVER THE DUCTED FAN

CROSS-REFERENCE TO RELATED APPLICATION

This application claims priority to German Patent Application No. 10 2019 112 132.9, filed May 9, 2019, the content of such application being incorporated by reference herein in its entirety.

FIELD OF THE INVENTION

The present invention relates to an aircraft, in particular a fully electric vertical take-off and landing (VTOL) aircraft.

BACKGROUND OF THE INVENTION

VTOL is the cross-language name given in the aerospace industry to any type of aircraft, drone or rocket that has the capability of lifting off and landing substantially vertically and without a runway. This collective term is used below in a broad sense that includes not just fixed-wing aircraft with wings, but rather also rotary-wing aircraft such as helicopters, gyrocopters, gyrodynes and hybrids such as composite or combination helicopters and convertiplanes. Short take-off and landing (STOL) aircraft, short take-off and vertical landing (STOVL) aircraft and vertical take-off and horizontal landing (VTHL) aircraft are also included.

US 2008/0054121 A1, which is incorporated by reference herein, discloses a VTOL aircraft with a fuselage which has front and rear drive units with in each case one fan which is arranged in an open channel wall, the forwardly directed portion of which comprises a domed, forwardly directed barrier which, by means of a horizontal sliding movement, opens the forwardly directed portion for cruising flight.

WO 2016/066848 A1, which is incorporated by reference herein, describes a drive module for a motor vehicle. The drive module comprises two drive devices with a total of at least three impellers with rotor blades, which are coupled to in each case one pivoting device such that at least two of the impellers, in an initial position, selectively overlap or are arranged adjacent to one another, wherein the pivoting devices have two different pivot axes.

SUMMARY OF THE INVENTION

Described herein is an aircraft, in particular a fully electric vertical take-off and landing aircraft in the above sense.

According to aspects of the invention, in order to realize a compact design in a VTOL concept allowing for lift and cruising flight, lifting rotors are integrated into the wing profile. The invention nevertheless allows for the fact that the lift performance for cruising flight and transition flight phases would be severely impaired by "holes" in the wing. Conversely, the performance of the ducted fans during the lift and transition phase would be severely reduced if, with regard to said impairment, said ducted fans were reduced in size to an excessive extent.

By means of the reduction according to aspects of the invention of the air resistance and increase of the lift, a reduction of the required power is achieved.

Further advantageous configurations of the invention are specified in the dependent patent claims. The aircraft may thus be equipped for instance with bent or even selectively bendable wings. A corresponding variant increases the effective wing surface in horizontal flight, without however increasing the footprint of the aircraft.

The aircraft may furthermore have a fast-charging battery system that provides the drive energy for vertical take-off and landing and horizontal flight and allows quick charging of the aircraft when stationary.

In this case, instead of free-moving rotors, a plurality of ducted fans, including of different sizes, may be used to drive the aircraft, as are known outside of the aerospace industry, for instance for hovercraft or fanboats. The cylindrical housing surrounding the fan may considerably reduce thrust losses caused by vortexes at the blade tips in such an embodiment. Suitable ducted fans may be aligned horizontally or vertically, designed so as to pivot between both positions or be covered by louvers during horizontal flight for aerodynamic reasons. Pure horizontal thrust generation using fixed ducted fans is additionally conceivable.

Finally, in addition to preferably fully autonomous operation of the aircraft, it is also possible to consider granting manual control to human pilots if they are sufficiently qualified, which gives the device according to aspects of the invention the greatest possible flexibility in terms of handling.

BRIEF DESCRIPTION OF THE DRAWING FIGURES

One exemplary embodiment of the invention is illustrated in the drawings and will be described in more detail below.

DETAILED DESCRIPTION OF THE INVENTION

The figures, when considered together, illustrate the design features of a preferred embodiment of the aircraft according to aspects of the invention.

In order to ensure good performance both of the wing 10 and of the lifting rotors, the channels thereof are covered both on the upper and on the lower wing surface by a set of louvers 11, 12 with a wing profile, which louvers are actuated by means of a linkage 13 which enables said louvers to be inclined at any desired angle.

Figure 1:
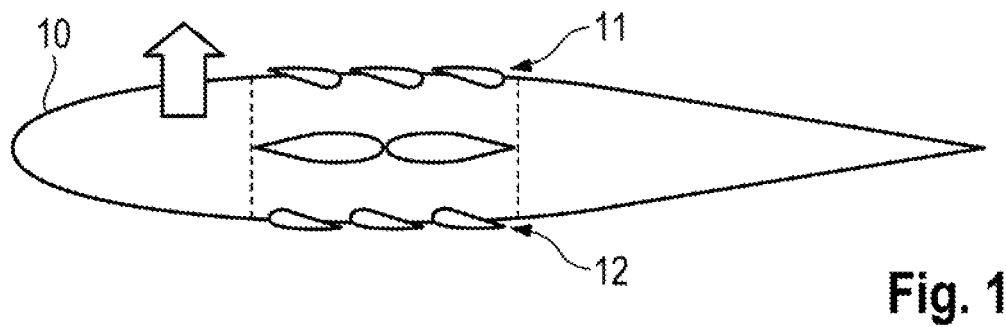
FIG. 1 shows the cross section of a wing during horizontal flight.
Figure 2:
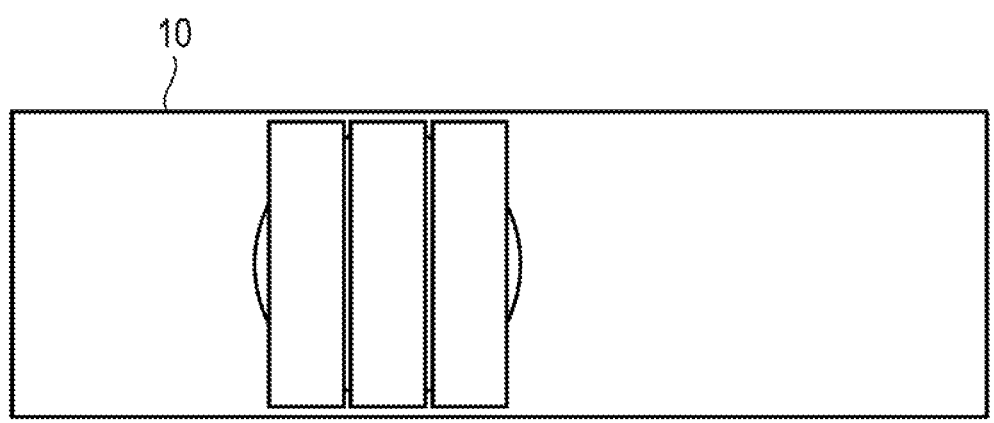
FIG. 2 shows a plan view of the wing during horizontal flight.
Figure 3:
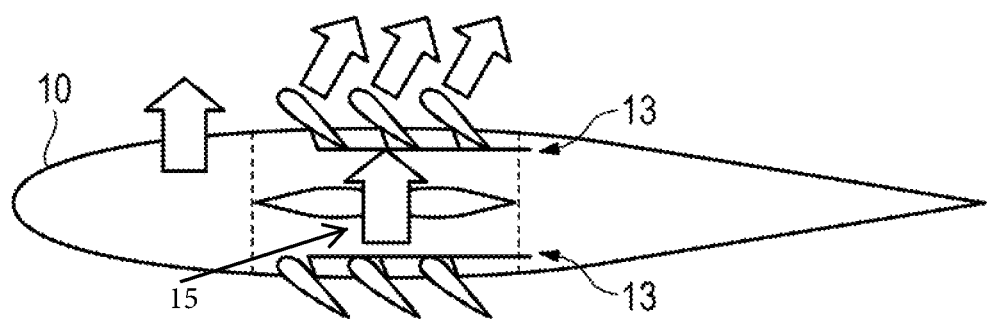
FIG. 3 shows a cross section of the wing during vertical flight and at the transition to horizontal flight.
Figure 4:
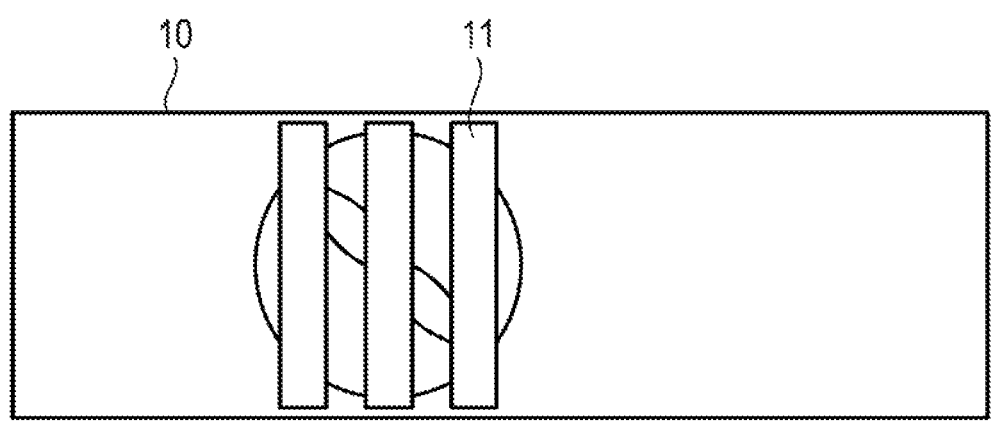
FIG. 4 shows a plan view of the wing during vertical flight and at the transition to horizontal flight.

During cruising flight, the louvers 11, 12 remain closed, such that the lift of the wing 10, marked in FIGS. 1 and 3 by an upward arrow, is maximized. During vertical flight, the louvers 11, 12 are opened in order to maximize the air mass flow that enters the fan 15 and thus in order to improve the lift, which is indicated in the drawing of FIG. 3 by a further arrow.

During the transition, the air flaps are moved into a series of positions such that the lift effected by wing 10, lifting rotor and louvers 11, 12 together is maximized at any speed and any angle of attack.

Figure 5:
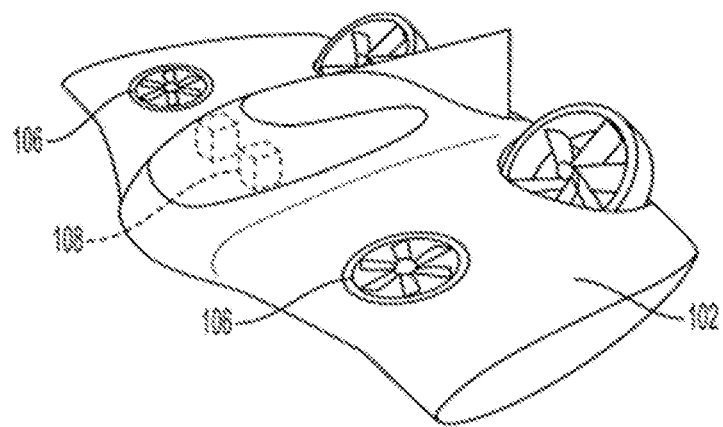
FIG. 5 depicts an isometric view of an aircraft, wherein the wings are shown in an extended configuration and the rear propellers are shown in an angled orientation.
Figure 6:
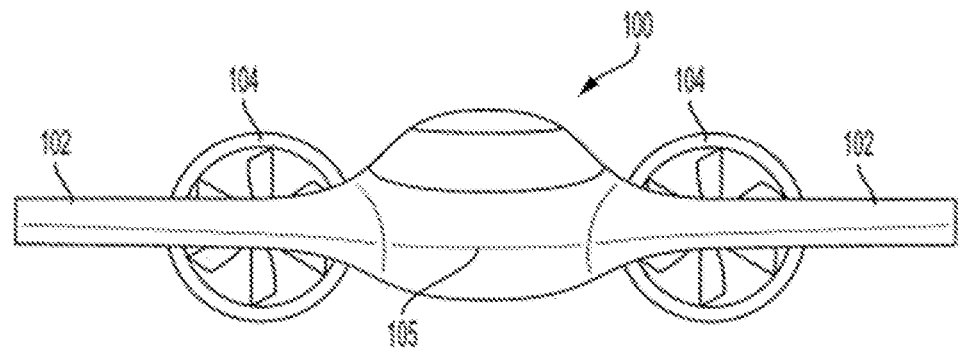
FIG. 6 depicts a front elevation view of the aircraft of FIG. 5, wherein the wings are shown extended configuration and the rear propellers are shown in a cruising orientation.
Figure 7:
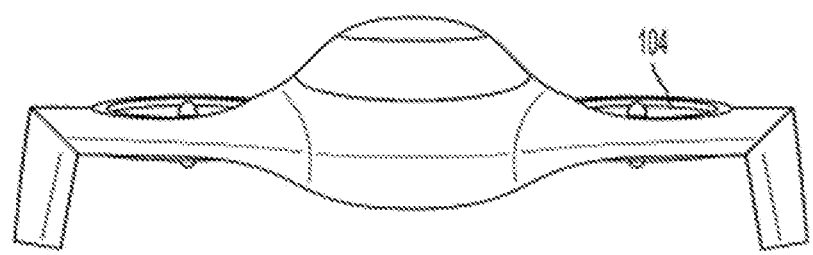
FIG. 7 depicts another front elevation view of the aircraft, wherein the wings are shown in a folded configuration and the rear propellers are shown in a take-off/landing orientation.

FIGS. 5-7 depict an aircraft 100 including foldable wings 102. Each wing 102 includes the components of wing 10. Louvers 11 and 12, which are not shown in FIGS. 5-7, cover each propeller 106. The wings 102 are shown in a folded configuration in FIG. 7 and an extended configuration in FIG. 6. A motor or solenoid is configured to move the wings between those configurations. Alternatively, the wings 102 may be permanently maintained in a folded (i.e., bent) position.

Rear propellers 104 are mounted on the trailing edge of the airfoils or wings 102 (i.e., the edge furthest from the nose 105). Propellers 104 may be referred to as cruising propellers because they are used during the cruising operation of the aircraft (at least in one position of the propellers 104). The propellers 104 are configured to pivot between two different positions, as shown in FIGS. 5-7. In the vertical position of the propellers 104 shown in FIG. 6, the propellers 104 generate maximum horizontal thrust for cruising operation of the aircraft (i.e., while the aircraft is flying through the air). In the horizontal position of the propellers 104 shown in FIG. 7, the propellers 104 generate maximum vertical thrust for take-off and landing operations of the aircraft. A motor or solenoid is configured to move the propellers 104 between those two positions. Alternatively, the propellers 104 may be immovable and fixed in a vertical position.

Horizontally mounted propellers 106 (each of which are analogous to fan 15) are fixedly mounted and integrated into the wings 102. Unlike the propellers 104, the position of the propellers 106 is fixed, however, those skilled in the art will recognize that the propellers 106 could be modified so that they are pivotable between vertical and horizontal positions. The propellers 106 generate maximum vertical thrust for take-off and landing operations of the aircraft. The propellers 106 may also be referred to herein as lifting propellers.

The propellers 104 and 106, which may also be referred to herein as fans, may be operated by a fully-electric drive. To that end, a battery charging system 108 including a charger, an inverter and a fast-charging battery are positioned within the fuselage of the aircraft for powering the propellers 104 and 106. The fuselage may also be configured to carry one or more passengers.

What is claimed:
1. An aircraft comprising:
a wing,
a ducted fan extending through the wing, and
movable louvers positioned over the ducted fan,
wherein the louvers comprise upper louvers positioned on a top surface of the wing and lower louvers positioned on a bottom surface of the wing,
wherein each louver is movable between a basic position and an active position, wherein in the basic position of the louvers, the louvers are arranged flush with the wing such that the upper louvers and lower louvers cover inlet and outlet openings of the ducted fan, and, in the active position of the louvers, (i) the louvers are not arranged flush with the wing such that the upper louvers and lower louvers do not cover the inlet and outlet openings of the ducted fan, (ii) the upper louvers extend to an elevation above a top surface of the wing, and (iii) the lower louvers extend to an elevation below a bottom surface of the wing,
wherein each louver of the upper louvers is a unitary member having a teardrop shape including a rounded end and a pointed end that is arranged opposite the rounded end,
wherein, in the active position of the upper louvers, the pointed ends are located within the wing while the rounded ends are located outside of the wing, and, in the basic position of the upper louvers, the pointed ends are arranged substantially flush with the top surface of the wing,
wherein each upper louver is positionable to a transition position when the aircraft transitions from vertical flight to horizontal flight, the transition position being defined between the active position and the basic position, and, wherein, as each upper louver moves from the basic position to the transition position, the pointed end of the upper louver is configured to move from a position that is substantially flush with the top surface of the wing to a position that is located inside of the wing.

2. The aircraft as claimed in claim 1, further comprising a first linkage for articulating the upper louvers, and a second linkage for articulating the lower louvers.

3. The aircraft as claimed in claim 1, wherein the aircraft is configured such that the louvers assume the basic position in cruising flight.

4. The aircraft as claimed in claim 1, wherein the aircraft has a fully electric drive.

5. The aircraft as claimed in claim 1, wherein the aircraft comprises bent or bendable wings.

6. The aircraft as claimed in claim 1, wherein the aircraft comprises a battery system.

7. The aircraft as claimed in claim 1, wherein the ducted fans comprise horizontally fixed ducted fans for take-off and landing.

8. The aircraft as claimed in claim 1, wherein the aircraft comprises vertically fixed ducted fans for generating propulsion.

9. The aircraft as claimed in claim 1, wherein the aircraft is configured to be selectively controlled in a fully autonomous manner.

10. The aircraft as claimed in claim 1, wherein in the active position of the lower louvers, the rounded ends are located within the wing while the pointed ends are located outside of the wing.

11. The aircraft as claimed in claim 10, wherein, in the basic position, the pointed ends of the upper louvers point towards a leading edge of the wing, and the pointed ends of the lower louvers point towards a trailing edge of the wing.

12. The aircraft as claimed in claim 1, further comprising a rear ducted fan positioned on a trailing edge of the wing behind the ducted fan.

13. The aircraft as claimed in claim 12, wherein the rear ducted fan is pivotable between a first orientation for generating vertical thrust, and a second orientation for generating horizontal thrust.

14. The aircraft as claimed in claim 13, wherein, in a cruising phase of the aircraft, the rear ducted fan is maintained in the second orientation and the louvers are all maintained in the basic position.

15. The aircraft as claimed in claim 13, wherein, in a lifting phase of the aircraft, the rear ducted fan is maintained in the first orientation and the louvers are all maintained in the active position.

16. The aircraft as claimed in claim 13, wherein, in a cruising phase of the aircraft, the rear ducted fan is maintained in the second orientation and the louvers are all maintained in the basic position, and, in a lifting phase of the aircraft, the rear ducted fan is maintained in the first orientation and the louvers are all maintained in the active position.

17. The aircraft as claimed in claim 1, wherein each louver is pivotable between the basic position and the active position.

18. The aircraft as claimed in claim 1, wherein, in the basic position of each upper louver, the pointed end is arranged closer to a leading edge of the wing than the rounded end.

19. The aircraft as claimed in claim 18, wherein, in the active position of each upper louver, the rounded end is arranged closer to the leading edge of the wing than the pointed end.

20. The aircraft as claimed in claim 1, wherein as each upper louver moves from the transition position to the active position, the pointed end of the upper louver is configured to move further inside of the wing.

* * * * *